United States Patent [19]

Suzuki

[11] 4,431,904
[45] Feb. 14, 1984

[54] ELECTRIC CIGAR LIGHTER

[75] Inventor: Masaru Suzuki, Chiryu, Japan

[73] Assignee: Seisakusho Kabushiki Kaisha Tokai Rika Denki, Aichi, Japan

[21] Appl. No.: 437,863

[22] Filed: Oct. 29, 1982

[30] Foreign Application Priority Data

Nov. 4, 1981 [JP] Japan .......................... 56-165305[U]
Nov. 10, 1981 [JP] Japan .......................... 56-168679[U]

[51] Int. Cl.³ ............................................ F23Q 7/24
[52] U.S. Cl. .................................. 219/265; 219/267; 219/512; 337/75; 337/105
[58] Field of Search ............... 219/263, 264, 265, 267, 219/512; 337/75, 103, 105

[56] References Cited

U.S. PATENT DOCUMENTS

| 2,704,318 | 3/1955 | Jorgensen et al. | 219/264 |
| 2,858,409 | 10/1958 | Dening | 219/264 |
| 2,883,510 | 4/1959 | Krautwurst et al. | 219/264 |
| 3,012,120 | 12/1961 | Gaudet | 219/265 X |
| 3,230,345 | 1/1966 | Horwitt | 219/265 |
| 3,330,937 | 7/1967 | Horwitt | 219/265 |
| 3,419,703 | 12/1968 | Sicard | 219/265 |
| 3,439,148 | 4/1969 | Horwitt | 219/265 |
| 3,462,721 | 8/1969 | Boudreau | 337/75 |

Primary Examiner—Volodymyr Y. Mayewsky

Attorney, Agent, or Firm—Jackson, Jones & Price

[57] ABSTRACT

The disclosure relates to an electric cigar lighter for use, for example in vehicles, having an improved circuit breaker which includes at least two thermostatic contacts mounted on a bottom of a tubular holder for receiving an igniting unit, an end cap secured to the outer face of the tubular holder, a movable contact unit which is movable in the end cap and a spring mounted in the end cap so as to rearwardly urge the movable contact unit. The thermostatic contacts are adapted to contact a bimetallic latch mounted in the tubular holder, and to rearwardly extend into the end cap. The movable contact unit includes a contact member in a form of a cap which, at a front end portion of a cylindrical wall thereof, a rib which is adapted to be engageable with ribs formed at the rear ends of the thermostatic contacts. During a normal operating condition, the ribs of the thermostatic contacts engage the rib of the contact member to retain the removable contact unit at the closed-circuit position, while, when the heating element is overheated and the thermostatic contacts are transformed due to the heat from the heating element, the spring causes the thermostatic contacts to disengage from the contact member to rearwardly move the movable contact unit toward an open-circuit position.

8 Claims, 7 Drawing Figures

ELECTRIC CIGAR LIGHTER

BACKGROUND OF THE INVENTION

The present invention relates generally to electric cigar lighters of the type adapted to be used in vehicles or the like, and more particularly to certain improvements in the circuit breaker employed in the lighters of this type which are automatic in their operation, and which are provided with a removable igniting unit which is manually moved to its closed-circuit position and automatically returned to its open-circuit position after a heating element carried by the unit has been brought into a red hot state.

Conventionally, there is provided a fuse as a circuit breaker which is formed of a fusible metallic material and incorporated in the electric circuit of the lighter so as to open the circuit to a heating element of the lighter upon either overheating thereof or upon a short-circuit or overload in the circuit.

The fuse as the circuit breaker as described above has such disadvantages that, when it melts at its middle portion so as to be separated in two parts due to the overheating of the heating element and the like to open the circuit, one of the separated ends thereof may accidentally contact a portion of some other members mounted in the lighter or the another device arranged adjacent to the fuse to cause a short circuit, and furthermore, troublesome and time-taking procedures are required to replace the separated fuse member by a new one.

SUMMARY OF THE INVENTION

It is therefore an essential object of the present invention to provide an electric cigar lighter having an improved circuit breaker which causes no short circuit when its opens the circuit of the electric cigar lighter due to overheating thereof.

Another object of the present invention is to provide an electric cigar lighter having a circuit breaker of the above type which can be repeatedly used and readily restored to the closed-circuit position from the open-circuit position.

A further object of the present invention is to provide an electric cigar lighter having a circuit breaker of the above type which is simple in construction and accurate in functioning with high reliability, and can be readily manufactured at low cost for incorporation into various lighters.

In accomplishing these and other objects, according to the present invention, there is provided an electric cigar lighter, for use for example in a vehicle, having an improved circuit breaker. The circuit breaker includes at least two thermostatic contacts mounted on a bottom of a tubular holder for receiving an igniting unit, an end cap secured to the outer face of the bottom wall of the tubular holder, a movable contact unit which is movable in the end cap and a spring mounted in the end cap so as to rearwardly urge the movable contact unit. The thermostatic contacts are so arranged as to contact a bimetallic latch, mounted in the tubular holder, and at the same time rearwardly extend into the end cap. The movable contact unit includes a terminal rivet connected to a source of power, and a contact member, in a form of a cap, electrically connected with the terminal rivet. The contact member has, at a front end portion of a cylindrical wall thereof, a rib which is arranged so as to be engageable with ribs formed at the rear ends of the thermostatic contacts. Under a normal condition, the ribs of the thermostatic contacts engage the rib of the contact member to retain the removable contact unit at the closed-circuit position, while, when the heating element is overheated, and consequently, the thermostatic contacts transform to some extent due to the heat from the heating element, the spring causes the thermostatic contacts to disengage the contact member of the unit to rearwardly move the movable contact unit toward the open-circuit position. Therefore, according to the arrangement as described above, once the movable contact unit has been moved to the open-circuit position during overheating of the heating element, the unit can be retained at the open-circuit position by the spring, thus no short circuit is caused. Furthermore, the movable contact unit can be readily restored to the initial closed-circuit position only by forwardly pushing the unit after the ribs of the thermostatic contacts have returned to the initial position.

BRIEF DESCRIPTION OF THE DRAWINGS

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals and symbols throughout several views of the accompanying drawings.

DETAILED DESCRIPTION OF THE INVENTION

Figure 1:
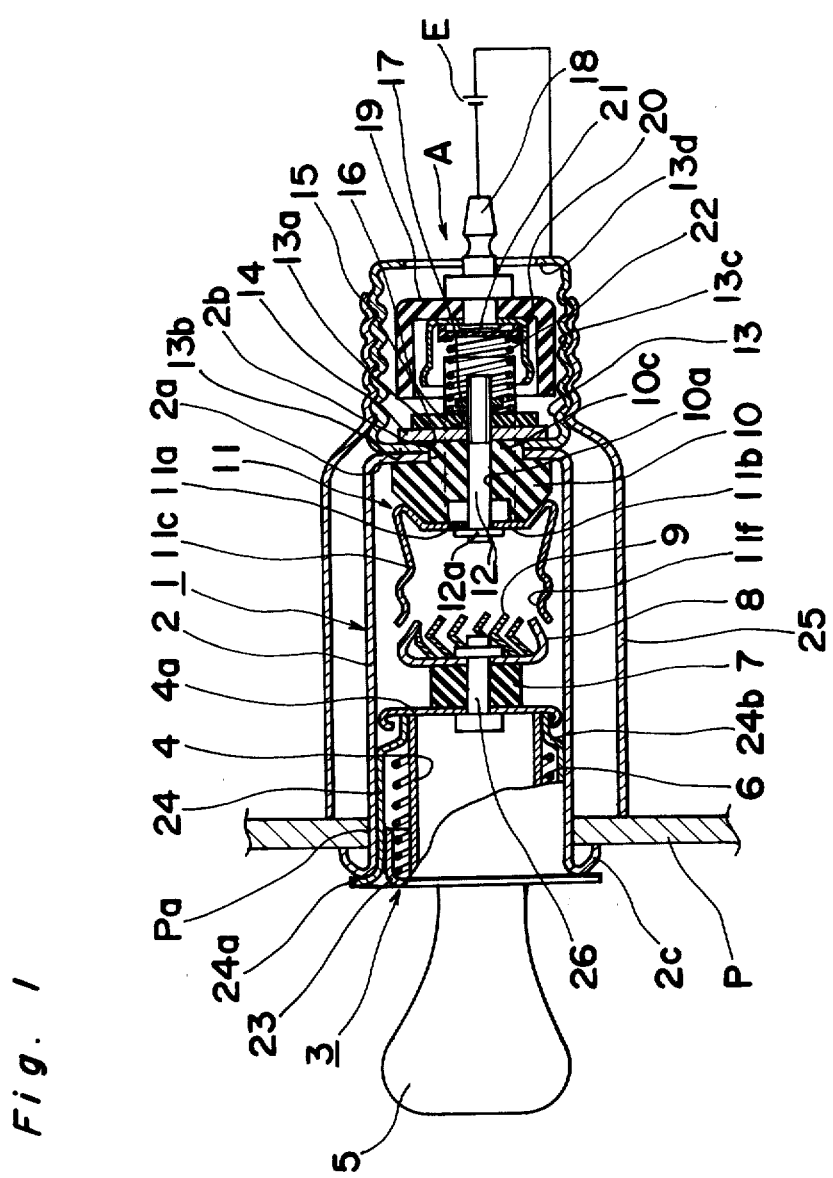
FIG. 1 is a sectional view of an electric cigar lighter according to a preferred embodiment of the present invention.
Figure 2:
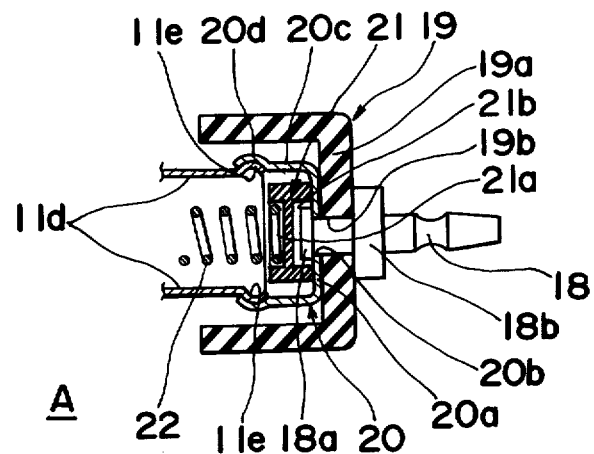
FIG. 2 is a sectional view of a movable contact unit in the closed-circuit position which is employed in the lighter in FIG. 1.
Figure 3:
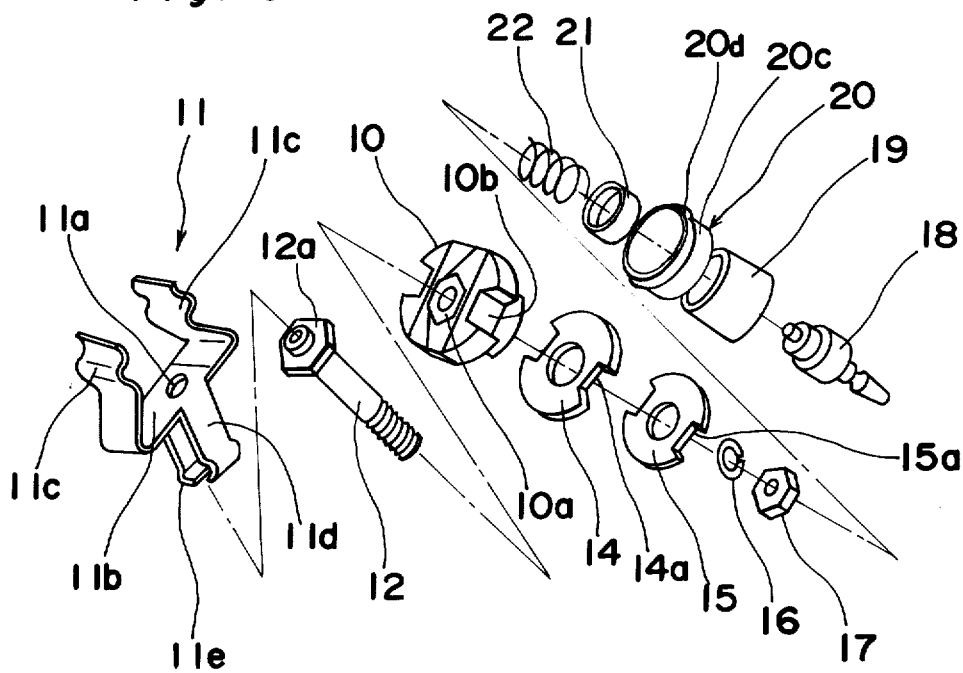
FIG. 3 is an exploded view of the essential part of the lighter in FIG. 1.

Referring to FIGS. 1 to 3, the cigar lighter according to the present invention comprises a socket 1 and, an igniting unit or removable plug 3 adapted to be detachably mounted in the socket 1.

The socket 1 includes an electric conductive tubular case or holder 2 having, at its front end, a flange 2c adapted to engage the front face of an instrument panel or other support P having an opening Pa in which the holder is inserted, and at its rear end, an end cap 13 the bottom wall of which faces the bottom wall 2a of said holder 2.

An insulating spacer 10, having a thermostatic or bimetallic latch 11 thereon, is mounted on the bottom wall 2a of the holder 2 such that a central bottom projection 10c thereof is inserted in both the central opening 2b formed in the bottom wall 2a of the holder 2 and the central opening 13a formed in the bottom wall 13b of the rear end cap 13. A securing screw 12 is inserted in an opening 11a of the latch 11 and bore 10a of the insulating spacer 10. The securing screw 12 has, at the front end thereof, a head portion 12a which clamps the bimetallic latch 11 to the front face of the insulating spacer 10 in a manner that the central bar portion 11b of the latch 11 is sandwiched by the head 12a of the screw 12 and the front face of the insulating spacer 10. The rear end of the screw 12 projects rearwardly from the bore 10a of the insulating spacer 10 to receive a washer 14, an insulating washer 15, a spring washer 16 and tying nut 17 which are mounted in the form of layers. These members, i.e. the bimetallic latch 11, insulating spacer 10, washer 14, and insulating washer 15 can be secured together to the bottom wall 2a of the holder 2 by threading the nut 17 to the screw 12 through the spring washer 16.

The end cap 13 as previously described is also secured to the bottom wall 2a of the holder 2 such that the bottom wall 13b thereof is sandwiched between the bottom end wall 2a of the holder 2 and the washer 14. The end cap 13 has a threaded cylindrical wall 13c, having, at its rear end, an inwardly extending flange 13d.

The holder 2 is secured to the instrument panel P such that it is clamped to the panel P by a tubular retainer 25 which is threaded on the threaded rear end 13c of the end cap 13 and engages the rear face of the panel P.

The bimetallic latch 11 has a pair of latch fingers 11c, at the opposite ends of its central bar portion 11b, which forwardly extends, and at the opposite sides of its bar portion 11b, a pair of thermostatic or bimetallic contacts 11d in the form of legs which rearwardly extend through each of recesses 10b, 14a and 15a of the insulating spacer 10, washer 14 and insulating washer 15 respectively into the interior of the end cap 13, and have latching ribs 11e at their rear end portions.

A movable contact unit A is deposited in the end cap 13 such that it can move in a direction of the axis of the holder 2 by a distance which is limited by the flange 13d of the end cap 13. The unit A comprises an insulating cap 19, in the bottom wall 19a of which a terminal rivet 18 is mounted such that the front end thereof is inserted from the outside into an opening 19b formed in the bottom wall 19a. There is provided in the cap 19 a contact member 20 in the form of a cap which is secured to the bottom wall 19a of the insulating cap 19 such that the front end of the terminal rivet 18 is inserted into an opening 20b formed in the bottom wall 20a of the contact member 20, and the bottom wall 20a is sandwiched together with the bottom wall 19a of the insulating cap 19 between a front or inner head portion 18a and a rear or outer flange 18b of the terminal rivet 18 respectively. In addition, the contact member 20 has a cylindrical wall 20c with a circular end rib 20d which is arranged such that the ribs 11e of said pair of bimetallic contacts 11d engages the inner wall of the rib 20d.

An insulating spring seat 21 is disposed on the bottom wall 20b of the contact member 20, while a helical spring 22 is interposed and compressed between the seat 21 and the insulating washer 15 such that the front end portion thereof engages the rear face of the insulating washer 15, while the rear end portion thereof engages a recess 21a formed in the front face of the spring seat 21. The seat 21 also has a rear recess 21b in which the head portion 18a is placed. As shown in FIGS. 1 and 2, in the normal condition, each rib 11e of bimetallic contacts 11d engages the rib 20d of the contact member 20 against the compression of the spring 22 so that the movable contact unit A can be retained in a closed-circuit position in the end cap 13.

The removable plug 3 is provided with a usual heating element 9 at its inner or rear end, which comprises a coil of resistance wire that is welded, at one end, to a rivet 26 and, at its other end, to a metal cap or ferrule 8 which is secured to a bottom wall 4a of a plug body 4 by said rivet 26 with a insulating spacer 7 interposed between the ferrule 8 and the bottom wall 4a of the plug body 4. An operating knob 5 is adapted to be secured to the front end of the plug body 4 in any convenient manner. As shown in FIG. 1, the body 4 is provided with an end cap 23 at its front face, and an outer sleeve 24 surrounding the body 4. The sleeve 24 has, at its front end, a flange 24a extending outwardly to detachable engage the flange 2c of the holder 2, and at the rear end thereof, another flange 24b extending inwardly to be fixed to the plug body 4. A coil spring 6 is interposed between the body 4 and the sleeve 24, and received at an upper end thereof, by the peripheral portion of the end cap 23 and at its lower end, by the flange 24b of the sleeve 24 so that the body 4 can rearwardly move in the direction of its axis with respect to the sleeve 24 and against the compression of the spring 6.

When it is desired to use the lighter, the plug 3 is manually pushed rearwardly within the holder 2 of the socket 1 to the closed-circuit position (not shown). During this movement of the plug 3, the flange 24a of the sleeve 24 engages the flange 2c of the holder 2, and thus the operating knob 5 together with the end cap 23, plug body 4 and etc. move rearwardly to compress the spring 24, and the ferrule 8 engages the bent ends 11f of the resilient latch fingers 11c of the bimetallic latch 11.

It will be understood by those skilled in this art that the bimetallic latch fingers 3a are adapted to gradually expand or move outwardly as they are heated by the heat from the heating coil 9 during energization thereof and the resiliency and rate of movement of these fingers are such that they will grip and retain the ferrule 8 against return movement by the ejecting spring 6 until the heating coil has attained some predetermined temperature at which the spring 6 will overcome the friction between the ferrule 8 and latch fingers 11c and return the plug 3 to the open-circuit or storage position from which it may be withdrawn for use.

Although the circuit for the heating element should be obvious from the illustration in FIG. 1, it should be noted that, during the energization thereof, the current is conducted from the terminal rivet 18, which is connected to a source of power E as previously described, through the contact member 20, bimetallic contacts 11d, bar portion 11b, bimetallic latch fingers 11c and ferrule 8 to the outer end of the heating coil 9, and from the inner end of this coil through the rivet 26, plug body 4 and sleeve 24 to the holder 2 or end cap 13 which is grounded.

Figure 4:
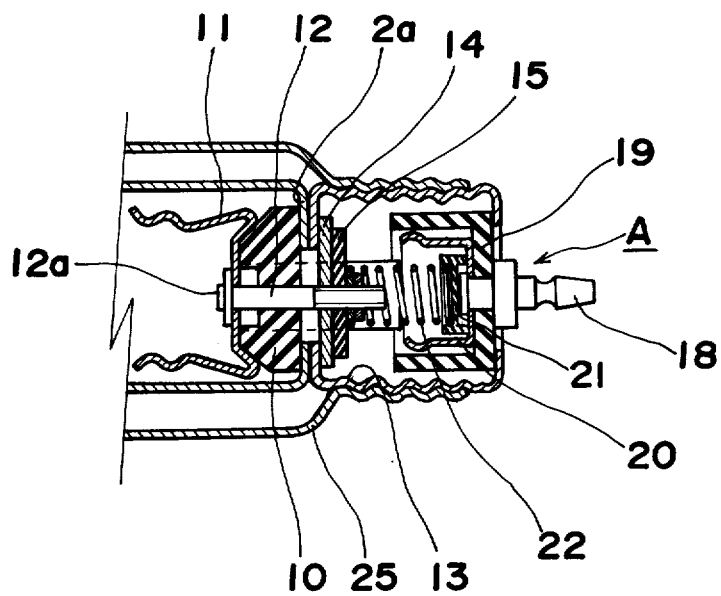
FIG. 4 is a partial sectional view of the lighter in FIG. 1 showing the movable contact unit in the open-circuit position.

During the energization for igniting the heating element 9, when this heating element is overheated due to some accident such as a wrong operation and the temperature of the bimetallic contacts 11d increases due to the heat radiated from the heating element 9, the pair of bimetallic contacts 11d inwardly expand so that when the spring 22 overcomes the friction between the ribs 11e of the bimetallic contacts 11d and the ribs 20d of the contact member 20, the bimetallic contacts 11d disengage the contact member 20, and thus the movable contact unit A is rearwardly pushed to the open-circuit position by the compression of the spring, with the bottom wall 19a of the insulating cap 19 being engaged with the flange 13d of the end cap 13, as shown in FIG. 4. The contacts 11d and contact unit member 20 form a circuit breaker assembly to ensure a safe operation of the lighter. When it is desired to restore the unit A to the initial or closed-circuit position after the temperature of the heating element 9 has been lowered and the bimetallic contacts 11d have returned to their initial position, and unit A may be manually and forwardly pushed against the compression of the spring 22 until the bimetallic contacts 11d engage the contact member 20.

Figure 5:
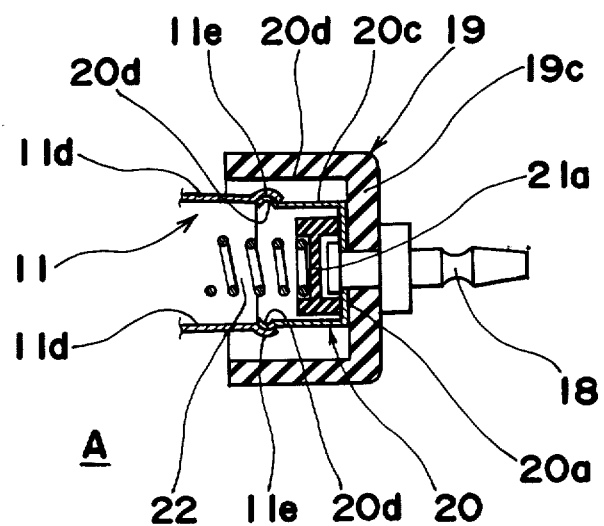
FIG. 5 is a view similar to FIG. 2 showing a modification of the present invention.

Referring now to a modification shown in FIG. 5, the bimetallic contacts 11d may be constructed such that the ribs 11e thereof engage the outer face of the ribs 20d of the contact member 20 in the closed-circuit position and they expand outwardly to disengage the contact member 20 when they are heated.

Figure 6:
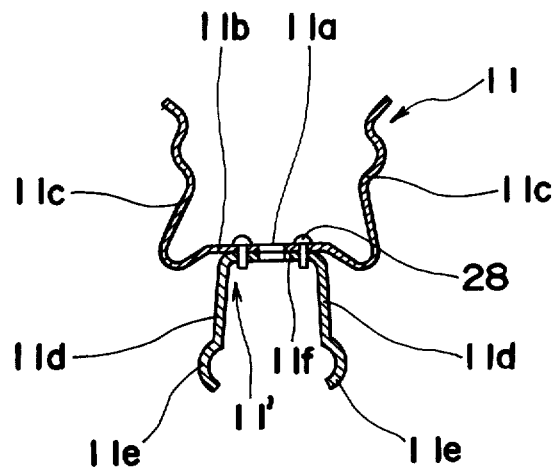
FIG. 6 is a sectional view of a bimetallic latch having a bimetallic contact member according to another modification of the present invention.
Figure 7:
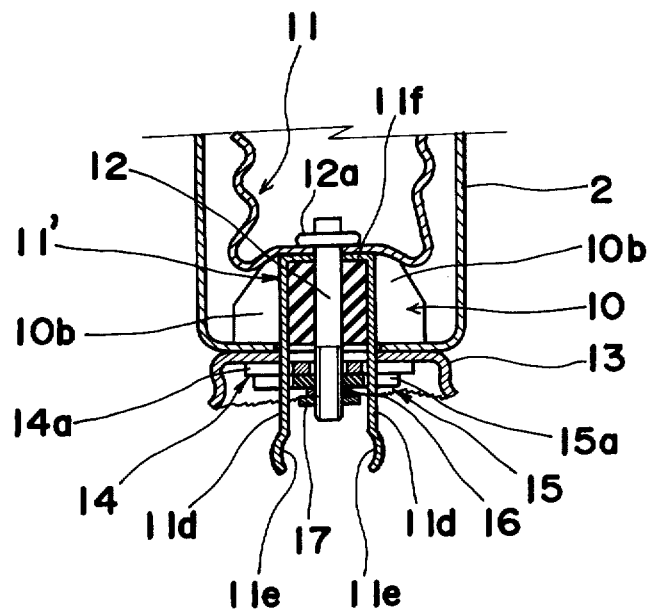
FIG. 7 is a view similar to FIG. 2, showing further modification of the present invention.

Although the bimetallic contacts 11d are constructed integrally with the bimetallic latch 11 as one unit in the embodiment as described above, such bimetallic contacts may be constructed separately from the bimetallic latch 11 as shown in FIGS. 6 and 7. Referring to FIG. 6, there is provided a contact member 11' which is made of a bimetallic metal and formed in a U-shape which includes a bottom wall 11f and a pair of contacts 11d rearwardly extending at the opposite ends of the bottom wall 11f. The contact member 11' is fixed to the bimetallic latch 11 such that the bottom wall 11f thereof faces the bottom wall 11b of the bimetallic latch 11, and both bottom walls 11f and 11b are rigidly secured by rivets 28.

Referring to FIG. 7, the bimetallic contact member 11' is secured to the insulating spacer 10 such that the bottom wall 11f thereof is sandwiched together with the bottom wall 11b of the bimetallic latch 11, between the front face of the insulating spacer 10 and the head portion 12a of the rivet 12.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An electric cigar lighter for use in vehicles and the like, which comprises a tubular holder having a thermostatic latch therein which is mounted on a bottom wall of said holder; a movable igniting unit which is slidably mounted in said holder and has, at its rear end, a heating element adapted to electrically connect said thermostatic latch when said unit is moved rearwardly to a closed-circuit position in the holder; an end cap, a bottom wall of which is secured to a rear face of the bottom wall of said holder; a plurality of thermostatic contacts in the form of legs which are secured to a bottom wall of said thermostatic latch and which rearwardly extend into said end cap, and also which respectively have ribs at their rear ends; a movable contact unit which is mounted in said end cap so as to be movable in an axial direction of said holder and for a limiting distance including an insulating holder, a terminal rivet secured to said insulating holder so as to extend rearwardly, a contact member in the form of a cap is secured to said insulating holder so as to face said thermostatic contacts and electrically connect said terminal rivet and has, at a front end of a cylindrical wall thereof, a circular rib engageable with the ribs of said thermostatic contacts, and a spring which is mounted in said end cap so as to rearwardly urge said movable contact unit and is adapted, during overheating of said heating element, to overcome friction between said ribs of the thermostatic contacts and said rib of the contact member and make said thermostatic contacts disengage from said contact member to rearwardly move said movable contact unit to its open-circuit position when the thermostatic contacts are physically transformed due to the heat from said heating element.

2. An electric cigar lighter as claimed in claim 1, wherein the ribs of said thermostatic contacts are adapted to engage an inner face of the rib of said contact member and also to move toward each other due to the heat generated from said heating element.

3. An electric cigar lighter as claimed in claim 1, wherein the ribs of said thermostatic contacts are adapted to engage an outer face of the rib of said contact member and to separate away from each other due to the heat generated from said heating element.

4. An electric cigar lighter as claimed in claim 1, wherein said thermostatic contacts are constructed integrally with said thermostatic latch as one unit.

5. An electric cigar lighter as claimed in claim 4, wherein said thermostatic latch has a pair of fingers extending forwardly from opposite ends of the bottom wall of said latch, and said thermostatic contacts comprises two legs-like contacts which extend rearwardly from opposite sides of said latch bottom wall.

6. An electric cigar lighter as claimed in claim 1, wherein said thermostatic contacts are constructed with a U-shaped contact member separate from said thermostatic latch.

7. An electric cigar lighter as claimed in claim 6, wherein said contact member is secured to said thermostatic latch, with a bottom portion of said contact member and the bottom wall of said latch faced against each other and fixed together by rivets.

8. An electric cigar lighter as claimed in claim 6, wherein said contact member is mounted on an insulating space, which in turn is mounted on a front face of the bottom wall of said holder, and said thermostatic latch is mounted on a bottom wall of said contact member, with the bottom portion of said contact member and the bottom wall of said latch faced against each other, furthermore said latch, said contact member and said insulating spacer are secured to the bottom wall of said holder by a rivet.

* * * * *